US011939962B2

(12) United States Patent
Maignan et al.

(10) Patent No.: US 11,939,962 B2
(45) Date of Patent: Mar. 26, 2024

(54) PITCH ASSEMBLY AND RELATED METHODS

(71) Applicant: General Electric Renovables Espana, S.L., Barcelona (ES)

(72) Inventors: Joel Maignan, Nantes (FR); Javier Bescos Grillo, Barcelona (ES); Alio Medina Diaz, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/691,514

(22) Filed: Mar. 10, 2022

(65) Prior Publication Data

US 2022/0290655 A1  Sep. 15, 2022

(30) Foreign Application Priority Data

Mar. 12, 2021  (EP) .................... 21382205

(51) Int. Cl.
*F03D 17/00* (2016.01)
*F03D 7/02* (2006.01)
*F03D 80/70* (2016.01)

(52) U.S. Cl.
CPC .......... *F03D 80/70* (2016.05); *F03D 7/0224* (2013.01); *F03D 17/00* (2016.05); *F05B 2260/79* (2013.01); *F05B 2270/802* (2013.01)

(58) Field of Classification Search
CPC ...... F03D 7/0224; F03D 1/0658; F03D 80/00; F03D 17/00
See application file for complete search history.

(56) References Cited

U.S. PATENT DOCUMENTS

| 2,806,402 | A | * | 9/1957 | Ferris ..................... B64C 11/301 |
| | | | | 116/303 |
| 10,927,819 | B2 | * | 2/2021 | Elmose ............... G01M 13/045 |
| 2018/0230965 | A1 | * | 8/2018 | Ejlersen ............... F03D 1/0658 |

FOREIGN PATENT DOCUMENTS

| CN | 103452754 B | 2/2016 | |
| CN | 109595128 B | 10/2019 | |
| DE | 19811952 A1 * | 9/1999 | .......... F03D 7/0224 |
| EP | 3336347 A1 * | 6/2018 | .......... F03D 7/0224 |
| IN | 201721019776 A * | 7/2019 | |

OTHER PUBLICATIONS

European Search Report Corresponding to EP21382205 dated Sep. 6, 2021.

* cited by examiner

*Primary Examiner* — Justin D Seabe
(74) *Attorney, Agent, or Firm* — Dority & Manning, P.A.

(57) ABSTRACT

The present disclosure relates to pitch assemblies and methods for determining one or more pitch references for a pitch control system of a wind turbine. The assembly comprises a wind turbine hub; a pitch bearing including a hub bearing ring configured to be attached to a hub flange and a blade bearing ring configured to be attached to a wind turbine blade; a target configured to be attached to one of the blade bearing ring and the hub; and a sensor configured to be connected to the other of the wind turbine hub and the blade bearing ring, and configured to sense the target such that a position of the target with respect to the sensor can be determined.

11 Claims, 8 Drawing Sheets

PITCH ASSEMBLY AND RELATED METHODS

The present disclosure relates to wind turbines, in particular to pitch assemblies and methods for determining one or more pitch references for a pitch control system of a wind turbine.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly or through a gearbox. This way, the generator produces electricity which can be supplied to the electrical grid.

The wind turbine hub may be rotatably coupled to a front of the nacelle. The wind turbine hub may be connected to a rotor shaft, and the rotor shaft may then be rotatably mounted in the nacelle using one or more rotor shaft bearings arranged in a frame inside the nacelle. The nacelle is a housing arranged on top of a wind turbine tower that contains and protects e.g. the gearbox (if present) and the generator and, depending on the wind turbine, further components such as a power converter, and auxiliary systems.

Wind turbine blades are generally coupled to the hub by a pitch bearing. A pitch bearing typically comprises an inner ring and an outer ring, and usually a plurality of rolling or roller elements between the inner and outer ring. A wind turbine blade may be attached either to the inner ring or to the outer ring, whereas the hub may be attached to the other of the inner and outer rings. The attachment may for example be performed with nuts and bolts.

When a pitch bearing ring is rotated with respect to the other bearing ring, e.g. with an electric or hydraulic pitch actuator, the blade may rotate with respect to the hub. For example, a blade attached to the bearing inner ring may rotate with respect to the hub. Causing a wind turbine blade to rotate in this way may generally be referred to as "pitching" of the blade. In (electro)mechanical pitch systems, a pinion may mesh with an annular gear typically provided on the bearing ring to which the blade is joined to in order to set the wind turbine blade into rotation. Pitching may adjust the loads acting on the blades and on the wind turbine, and is used to adapt the blades to prevailing wind conditions to optimize or improve operation of the wind turbine. Also, pitching of the blades may be used when shutting down the wind turbine. In such an occasion, the blades are pitched to their "feathered" position.

In order to accurately control a pitch angle during operation, an initial or homing reference needs to be known and defined in a control system, e.g. by a pitch control system and a wind turbine controller. This initial reference point serves as a reference for pitching the blade later on. For example, a wind turbine controller may indicate the pitch system to pitch the blade 30°, the 30° being applied with respect to this initial or reference point.

The pitch homing reference, i.e. a starting point or axis from which a pitch angle is measured, calculated or indicated, may indicate a pitch position to be maintained at wind speeds lower than a nominal wind speed in some examples. This position may be known as "below rated pitch position" or "default pitch position". In these examples, pitching an angle of about 90° may place the rotor blade in a feathered position.

It is known to set a pitch homing reference once the wind turbine blade is already mounted to the hub at an installation site. For example, the wind turbine blade may have a projection protruding towards an interior of the hub which may be detected by a device inside the hub. In some of these examples, the hub may include a laser and a sensor. The laser may emit light substantially parallel to a blade length and the sensor may collect one or more reflections of this light. When the wind turbine blade is pitched, the blade flange may interrupt the light emitted by the laser and the light collected by the sensor may change. Therefore, the collision of the emitted light with the blade flange may indicate the pitch homing reference.

As the blade projection is placed at a specific circumferential location in the interior blade surface and the laser and sensor are placed at a specific circumferential position inside the hub, a pitch reference may be set. After the blade projection is aligned with the laser and sensor, the pitch reference may become known to the wind turbine control system, e.g. to a pitch control system and/or to a main wind turbine controller.

Such systems and methods for determining a pitch homing reference can require a significant amount of time onsite, be it onshore or offshore, for installation and commissioning. Operators therefore may need to stay at high altitudes and at possibly less than ideal weather conditions during prolonged time periods. Weather conditions may be particularly hard in an offshore environment. Setting an initial pitch homing reference may entail a substantial risk for the operators involved. Also, the homing process takes time, and especially in the case of offshore wind turbines, this can make the installation process very expensive.

Having a pitch homing reference established as precise as possible is also very important at a single blade level as well as at a rotor level. An imprecise pitch reference may cause one or more wind turbine blades to be in a position that is not the actual position indicated by a wind turbine controller, which may cause a reduction of the energy produced by the wind turbine and stresses in the wind turbine. Also, load imbalances may arise if the pitch homing reference is not substantially the same for each blade of the rotor. The life service of the wind turbine may be thus reduced and the need for maintenance and repairs increased.

SUMMARY

In an aspect of the present disclosure, a pitch assembly is provided. The pitch assembly comprises a wind turbine hub, a pitch bearing, a sensor and a target. The pitch bearing includes a hub bearing ring configured to be attached to a hub flange and a blade bearing ring configured to be attached to a wind turbine blade. The target is configured to be attached to one of the blade bearing ring and the wind turbine hub. The sensor is configured to be connected to the other of the wind turbine hub and the blade bearing ring, and is configured to sense the target such that a position of the target with respect to the sensor can be determined.

According to this aspect, a sensor may be attached at a specific position to the hub and a target may be attached at a specific position on the bearing ring to which a wind turbine blade may later on be joined. Alternatively, a sensor may be attached at a specific position on the bearing ring to which a wind turbine blade may later on be joined and a target may be attached to the hub. The target may be sensed by the sensor. A position of the target with respect to the sensor may be determined. Any sensors allowing to know a position of the target with respect to the sensor may be used. For example, magnetic, inductive, capacitive or color sensors may be used.

Determining a pitch reference, be it a pitch homing reference or another pitch reference, by placing a target or a sensor on the blade bearing ring may avoid the need to attach a wind turbine blade to the hub in order to determine the pitch reference. Therefore, the determination may be performed before installing the wind turbine on site, even before transporting the hub and the blades to an installation site for the wind turbine. For example, the alignment may be performed at a hub assembly plant. As alignment may be done in advance, the time required for installation and commissioning of the wind turbine may be reduced. Also, operator safety may be increased as operators would not need to perform alignment on site, e.g. in a hub or nacelle at a height of 70 meters, 100 meters or more. Both aspects may be particularly relevant for offshore wind turbines, wherein the weather and environmental conditions may increase the difficulty and the risk of wind turbine installation and commissioning.

Throughout this disclosure, a "reference for a pitch system" or a "pitch reference" may be understood as a reference point or axis for at least a pitch control system. Such a reference may be a "pitch homing reference" or another reference with may be considered relevant or of interest.

A "pitch homing reference" may herein be understood as a reference point or axis from which pitch angles may be determined, calculated, measured or indicated, e.g. by a pitch control system and/or a main wind turbine controller. In particular, this reference point may be a "zero" or starting point for pitching a wind turbine blade. The pitch homing reference may in some examples indicate a pitch position to be maintained at wind speeds lower than a nominal wind speed. A pitch reference different from the pitch homing reference may for example indicate a feathered position of a wind turbine blade.

In a further aspect of the disclosure, a method for determining a reference for a pitch control system, the pitch reference being a reference point for the pitch control system, is provided. The method comprises attaching a first bearing ring of a pitch bearing to a hub flange of a wind turbine hub. The method further comprises determining a pitch reference by a sensor detecting that a target is in a predetermined position with respect to the sensor when rotating a second bearing ring of the pitch bearing.

In a further aspect of the disclosure, a method for determining a reference usable for or during pitching of a wind turbine blade, is provided. The method comprises attaching a first ring of a pitch bearing to a hub flange of a wind turbine hub; attaching a light emitting and collecting device, LECD, comprising a light source and a light sensor to the hub at a first reference setting position; attaching a target to a second ring of the pitch bearing at a second reference setting position; emitting light towards an outside of the hub and parallel to a pitch axis; rotating the second bearing ring; and determining a pitch reference by detecting a change in the light received by the light sensor when the first and second reference setting positions become aligned in a direction substantially parallel to a pitch axis.

Throughout this disclosure, a light emitting and collecting device (LECD) may be understood as a set of a light source element and a light receiving element. These light emitter and light sensor may be located together, for example inside a case or apparatus that contains them such as a laser sensor; or may be separate elements, for instance the light sensor may be a camera and the light emitter may be a laser or a light-emitting diode (LED). If the light emitter and the light sensor belong to a same apparatus, they may be controlled in a dependent manner, i.e. they may share a control processing unit (CPU) and a memory. If the light emitter and the light sensor are separate elements, they may not share a CPU and a memory. In this case, an additional device such as a controller e.g. placed in the hub may gather data from both elements and operate with this data. In some examples the emitter and sensor may be interlinked and able to communicate with each other, if needed, to control for example the emission of light at specific times and/or frequencies.

"Predefined reflective characteristics" as used throughout the present disclosure may be understood as the target having a known reflective property i.e. if and when the target interferes with a light beam from the LECD, this can be detected and identified because it is known how the target will interfere with the light beam.

DETAILED DESCRIPTION OF EXAMPLES

Figure 1:
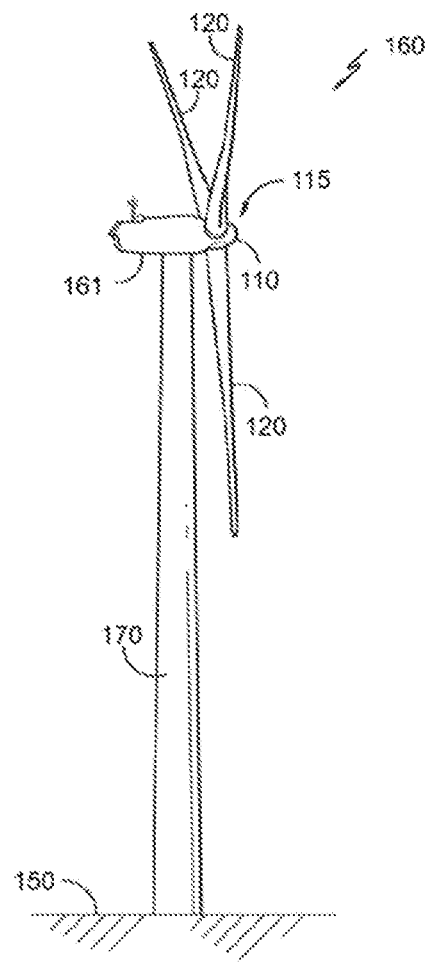
FIG. 1 schematically illustrates a perspective view of one example of a wind turbine.

Reference now will be made in detail to embodiments of the invention, one or more examples of which are illustrated in the drawings. Each example is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a perspective view of one example of a wind turbine 160. As shown, the wind turbine 160 includes a tower 170 extending from a support surface 150, a nacelle 161 mounted on the tower 170, and a rotor 115 coupled to the nacelle 161. The rotor 115 includes a rotatable hub 110 and at least one rotor blade 120 coupled to and extending outwardly from the hub 110. For example, in the illustrated embodiment, the rotor 115 includes three rotor blades 120. However, in an alternative embodiment, the rotor 115 may include more or less than three rotor blades 120. Each rotor blade 120 may be spaced about the hub 110 to facilitate rotating the rotor 115 to enable kinetic energy to be transferred from the wind into usable mechanical energy, and subsequently, electrical energy. For instance, the hub 110 may be rotatably coupled to an electric generator 162 (FIG. 2) positioned within the nacelle 161 to permit electrical energy to be produced.

Figure 2:
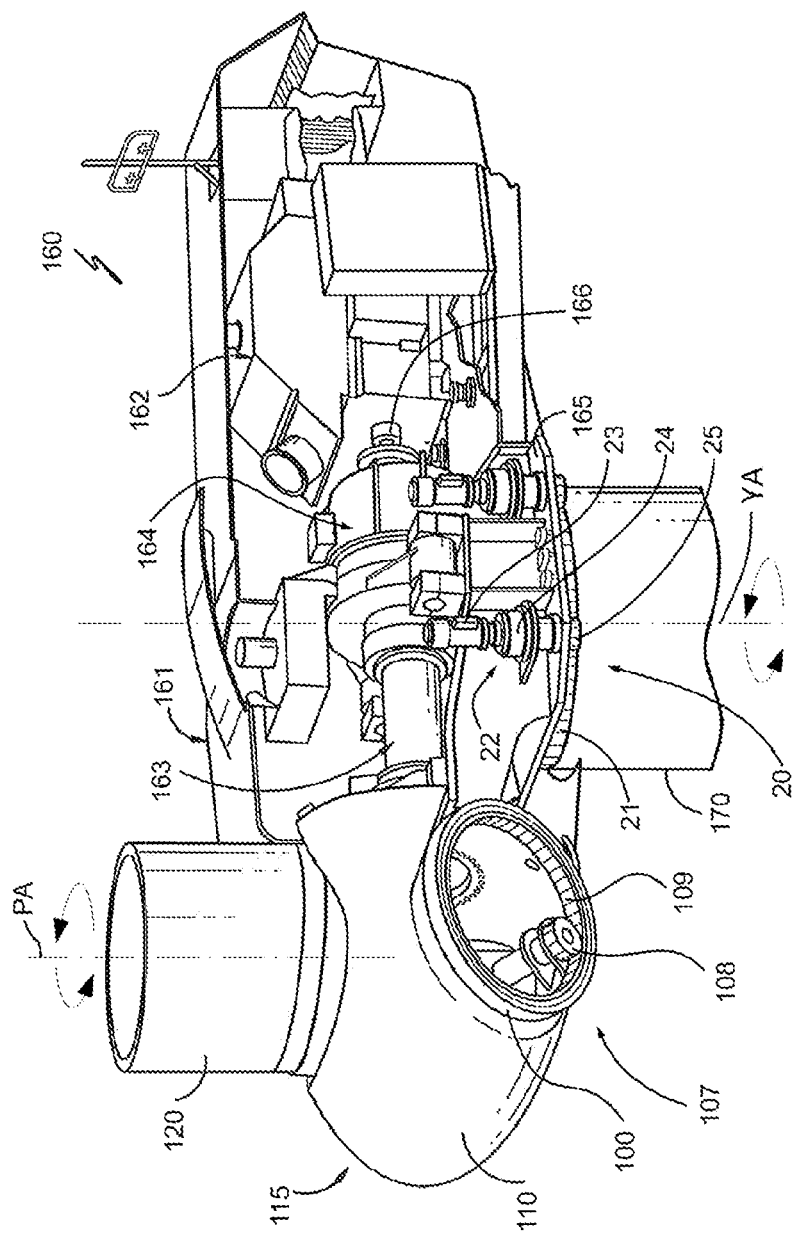
FIG. 2 illustrates a simplified, internal view of one example of the nacelle of the wind turbine of FIG. 1.

FIG. 2 illustrates a simplified, internal view of one example of the nacelle 161 of the wind turbine 160 of FIG. 1. As shown, the generator 162 may be disposed within the nacelle 161. In general, the generator 162 may be coupled to the rotor 115 of the wind turbine 160 for generating electrical power from the rotational energy generated by the rotor 115. For example, the rotor 115 may include a main rotor shaft 163 coupled to the hub 110 for rotation therewith. The generator 162 may then be coupled to the rotor shaft 163 such that rotation of the rotor shaft 163 drives the generator 162. For instance, in the illustrated embodiment, the generator 162 includes a generator shaft 166 rotatably coupled to the rotor shaft 163 through a gearbox 164.

It should be appreciated that the rotor shaft 163, gearbox 164, and generator 162 may generally be supported within the nacelle 161 by a support frame or bedplate 165 positioned atop the wind turbine tower 170.

The nacelle 161 may be rotatably coupled to the tower 170 through a yaw system 20 in such a way that the nacelle 161 is able to rotate about a yaw axis YA, or there may be other ways to position the rotor in the desired angle to the wind. If there is a yaw system 20, such system will usually comprise a yaw bearing having two bearing components configured to rotate with respect to the other. The tower 170 is coupled to one of the bearing components and the bedplate or support frame 165 of the nacelle 161 is coupled to the other bearing component. The yaw system 20 comprises an annular gear 21 and a plurality of yaw drives 22 with a motor 23, a gearbox 24 and a pinion 25 for meshing with the annular gear 21 for rotating one of the bearing components with respect to the other.

As indicated above, blades 120 are coupled to the hub 110 by a pitch bearing 100 in between the blade 120 and the hub 110. The pitch bearing 100 comprises an inner ring 103 and an outer ring 104. A wind turbine blade may be attached either at the bearing inner ring or at the bearing outer ring, whereas the hub is connected at the other. A blade 120 may perform a relative rotational movement with respect to the hub 110 when a pitch system 107 is actuated. The inner bearing ring may therefore perform a rotational movement with respect to the outer bearing ring in FIG. 2. The pitch system 107 of FIG. 2 comprises a pinion 108 that meshes with an annular gear 109 provided on the inner bearing ring to set the wind turbine blade into rotation around a pitch axis PA.

Figure 3:
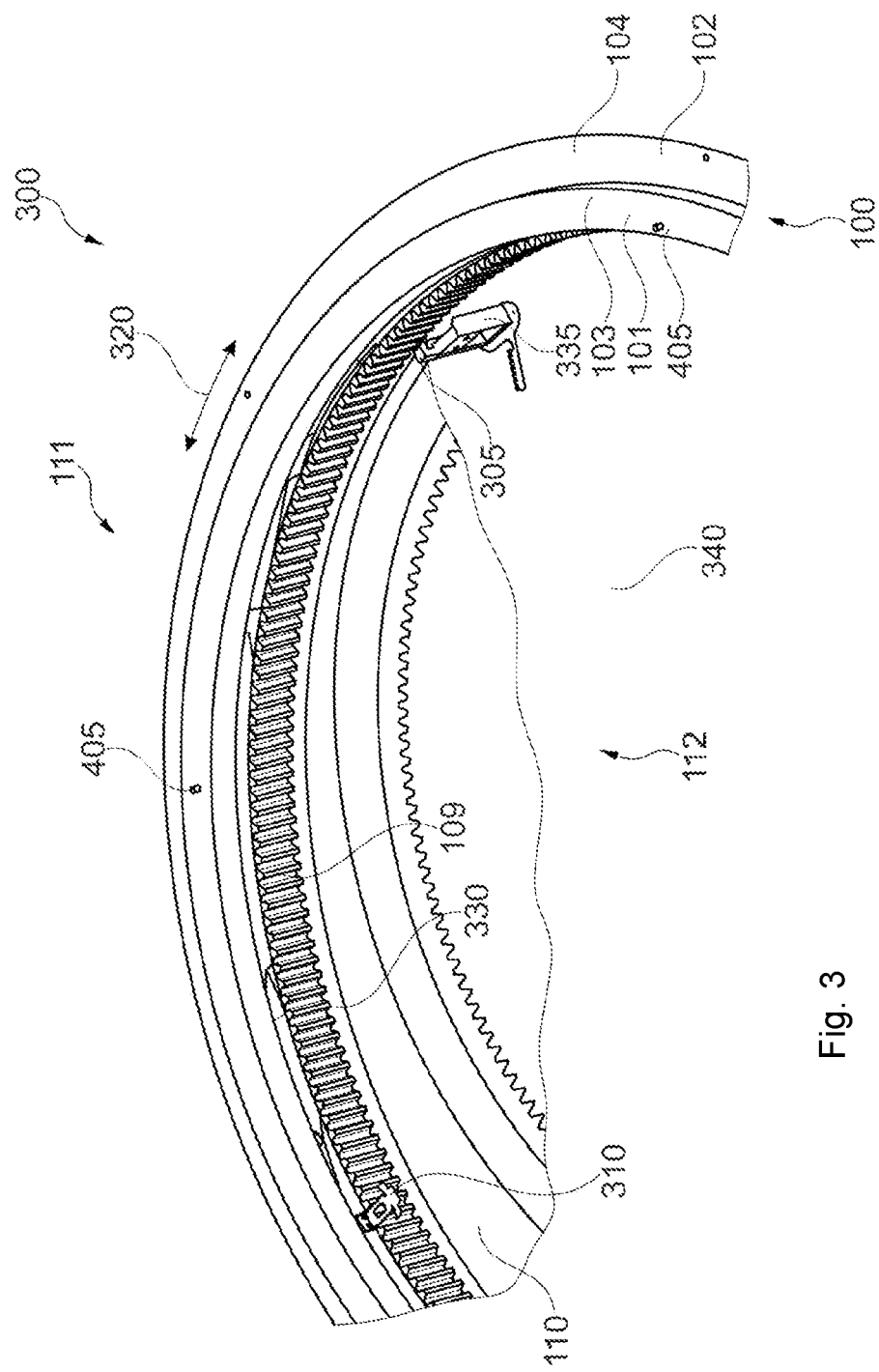
FIG. 3 schematically illustrates an example of a pitch assembly for setting a pitch reference for a pitch control system.

FIG. 3 schematically illustrates an example of a pitch assembly 300. The pitch assembly 330 is suitable for setting a pitch reference for a pitch control system, e.g. a pitch homing reference, for a wind turbine blade 120.

The pitch assembly 300 comprises a wind turbine hub 110, a pitch bearing 100, a sensor (305) and a target 310.

The pitch bearing 100 comprises a blade bearing ring 101 and a hub bearing ring 102. The hub bearing ring 102 is configured to be attached to a hub flange 440 (see e.g. FIG. 8) and the blade bearing ring 101 is configured to be attached to a wind turbine blade 120, more specifically to a mounting flange of the blade.

The target 310 is configured to be attached to one of the blade bearing ring 101 and the wind turbine hub 110. For example, the target 310 may be configured to be attached to the blade bearing ring 101.

The sensor 305 is configured to be connected to the other of the blade bearing ring 101 and the wind turbine hub 110. For example, the sensor may be configured to be attached to the wind turbine hub 110. The sensor 305 is configured to sense the target 310 such that a position of the target 310 with respect to the sensor 305 can be determined.

In some examples, sensing the target 310 may indicate that the target 310 and the sensor 305 have been aligned, for instance in a direction substantially parallel to a pitch axis. The alignment may indicate that a pitch homing reference has been reached or that an additional or intermediate reference has been attained. In the second case, the pitch homing reference may be determined from the additional or intermediate reference by knowing an angular distance between the alignment position and the desired pitch homing reference.

Figure 5:
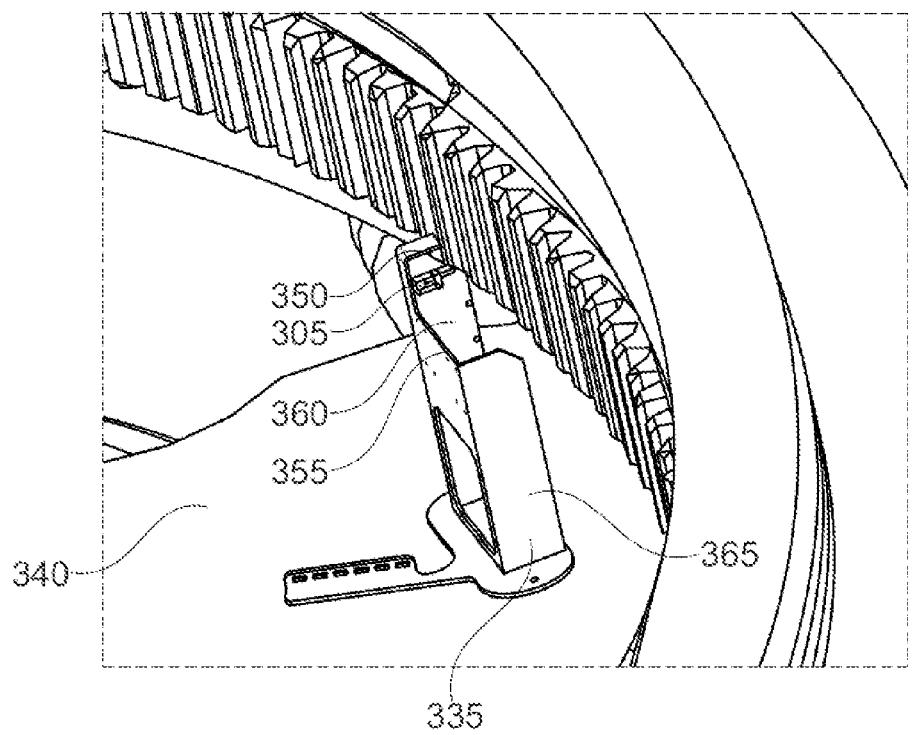
FIG. 5 schematically illustrates an example of a light emitting and collecting device (LECD) mounted to a support.

In some examples, the sensor 305 may be a light emitting and collecting device 305 (LECD, better seen in FIG. 5). An LECD 305 comprises a light source configured to emit light. The LECD 305 in this example also comprises a light sensor which is configured to receive one or more reflections of the emitted light. The target 310 may have predefined reflective characteristics such that a position of the target 310 with respect to the LECD 305 can be determined.

In FIG. 3, the hub bearing ring 102 is a bearing outer ring 104 and the blade bearing ring 101 is a bearing inner ring 103. The opposite may be the case in other examples.

A hub flange to which a bearing ring may be attached to, as well as an attached bearing ring, define a circumferential direction 320 and a radial direction 321. A pitch axis may be then substantially perpendicular to the circumferential 320 and radial 321 directions.

In some examples, the light source may be configured to emit light towards an outside 111 of the hub 110. In FIG. 3, reference sign 112 represents an inside of the hub 110. In this or other examples, the light source may be configured to emit light substantially parallel to a pitch axis PA (see FIG. 2).

If light is emitted towards an outside 111 of the hub 110, it is understood that the target 310 is above the LECD 305. "Above" may in general be understood as being in a plane (including the radial 321 and circumferential directions 320) over a reference. In FIG. 3, and more clearly in FIG. 6, the target 310 is above the LECD 305. However, it is not precluded that light may be emitted towards an inside 112 of the hub 110 and that the target 310 could be below the LECD 305 in some other examples.

The light source and the light sensor of the LECD 305 are deemed to be included in element 305 in FIG. 3, and in general in the depicted figures. However, it should be noted that it is also possible that that element 305 may refer to a light source only and that the light sensor is placed somewhere else. For example, the light source and the light sensor may be separate elements which may be placed at an inside 112 of the hub 110 along a radial direction 321 or a circumferential direction 320 at a certain distance from one another.

When the blade bearing ring 101 is rotated using a pitch system, the target 310 can in some positions modify the light emitted by the light source. As a consequence, light collected by the light sensor may substantially vary. For instance, the light sensor may be sensing a substantially constant light input, but when the target interferes with the emitted light, the impact of the light emitted by the light source on the target may cause the amount of light received by the sensor to substantially increase or decrease.

A change in the light received by the sensor due to the target 310 modifying the light emitted by the light source, may therefore indicate that a specific position has been achieved. This specific position may be a pitch homing reference in some examples. In some other examples, this specific position may be used for determining a pitch homing reference as explained further below.

Modifying, by the target 310, the light emitted by the light source, may include changing a reflection (e.g. a trajectory) of the emitted light. Modifying the light emitted by the light source may change the amount of light received by the light sensor. The target 310 may be specifically configured for altering the light emitted by the light source.

In some examples, the target 310 may modify the light emitted by the light source when the light source and the target 310 are aligned in a pitch axis direction. In other examples, this specific alignment is not required.

The pitch homing reference, and optionally an additional pitch reference, may be stored for indicating them later to a wind turbine controller, e.g. a main wind turbine controller, and a pitch system controller. The one or more pitch references may be also indicated to a pitch motor.

As a pitch reference may be obtained by attaching a target 310 to the blade bearing ring 101 (or the wind turbine hub 110, and a sensor to the blade bearing ring 101), a wind turbine blade 120 does not need to be connected to the hub 110 by the blade bearing ring 101 in order to determine the pitch reference. Therefore, the pitch reference may be obtained before carrying the wind turbine components to the installation site, for instance in an assembly plant. Installation and commissioning time, as well as the risk for the operators performing the installation and commissioning may be thus reduced.

This may be particularly important for offshore installation and commissioning, where the environmental and atmospheric conditions may difficult carrying successful and smooth installation and commissioning.

Careful and precise attachment of the target 310 to the blade bearing ring 101 or the hub 110, and of the light source and light sensor to the hub 110 or the blade bearing ring 101, may help to reduce errors in determining a pitch reference. Likewise, later careful and precise attachment of a wind turbine blade 120 to the blade bearing ring 120 may decrease errors when pitching.

Figure 4:
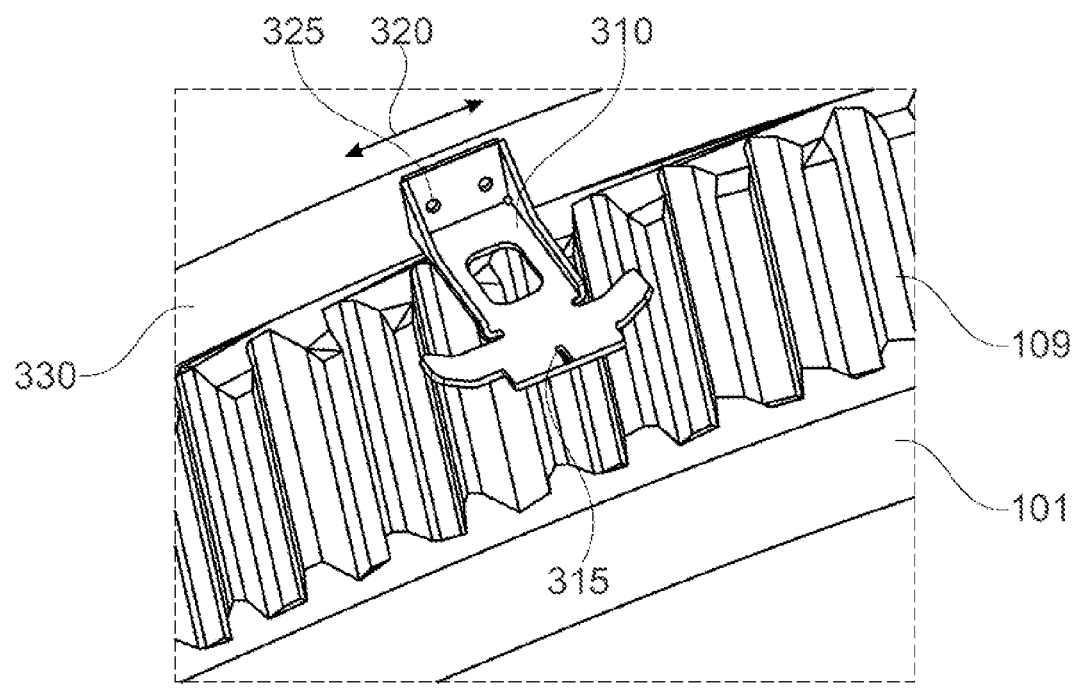
FIG. 4 schematically illustrates an example of a target of the pitch assembly.

In some examples, as e.g. in FIG. 4, the target 310 may include a target portion 315 with different reflectivity properties than other portions of the target 310, e.g. all the other portions of the target 310. The target portion 315 may cause a variation in the reflection of the light emitted by the light source, and thus on the light that the light sensor receives. The target portion 315 may change a trajectory of the impinging light or leave it unaffected. The target portion 315 may be of or may include different materials than other target portions, including all the other target portions. In some examples, the target portion 315 may be more reflective than the remaining target portions. For example, the target portion 310 may have reflective paint. In some other examples, the target portion 315 may be a slit.

By defining one or more portions of target 310 that may alter the emitted light, not only a difference between the light received when the target 310 modifies it and when the target 310 does not modify it may be detected, but a further difference related to light reflected on different portions of the target 310 may also be detected. A pitch reference may then be more precisely determined.

The extension of the target portion 315, e.g. of a slit, in a circumferential direction 320 may be less than 1 mm, optionally less than 0.5 mm. A shorter the target portion 315 in a circumferential direction 320 may increase the precision in the establishment of a pitch reference.

The target 310 may be attached to the blade bearing ring 101 or the hub 110 in different ways. In the examples of FIGS. 3 and 4, mechanical fasteners 325 such as bolts, screws or rivets are used. In some other examples, other fasteners, e.g. adhesive, may alternatively or additionally be used. In general, any number of fasteners and types of fasteners may be used. The types of fasteners may be for example selected depending on whether the target 310 will be left attached during operation of the wind turbine 160 or whether it 310 will be removed before the wind turbine 160 starts to operate.

The target 310 may be attached to a side 330 of the blade bearing ring 101 on which a drive is configured to act. A drive may include an electric motor, reduction gearing and a pinion 108 in some examples. The target 310 may be attached to another side of the blade bearing ring 101 in other examples.

The pitch assembly 300 may further include a support 335 to which the sensor may be attached. When the sensor is an LECD, the light source, and optionally the light sensor, may be attached to the support 335. The support 335 may help to place at least the light source in a more suitable position for transmitting light, e.g. closer to the target 310. The support 335 may be placed on a platform 340 inside the hub 110 when the target 310 is attached to the bearing inner ring 103.

If the bearing inner ring 103 is attached to the hub 110 and the target 310 is attached to the bearing outer ring 104, a platform 340 for supporting at least the light source may be placed in an outside 111 of the hub 110. In this case, the platform 340 may be attached directly to the hub 100 or additional connectors enabling a mechanical connection between the hub 110 and the platform 340 may be provided. The bearing outer ring 104 may include an annular gear 109 in some of these examples for rotating the bearing outer ring 104 with respect to the bearing inner ring 103 and the hub 110.

If the target 310 is to be attached to the hub 110 instead of the sensor 305, a support 335 may also be used to connect the target 310 to the hub 110.

In some examples, the support 335 may comprise a reflector 350 and may have a height such that the target 310 can pass between the light source and the reflector. As the light emitted by the light source may impinge on the reflector 350 unless the target 310 modifies the path followed by the emitted light, the reflections collected by the light sensor may provide a more constant, flatter and less varied evolution of the received light with time than without the presence of the reflector 350. Therefore, the passage of the target 310 above (or below) the light source may be more easily and clearly detected. Accordingly, the use of the reflector 350 may improve the precision of the determination of a pitch reference.

A distance between the reflector 350 and the support body 335 and/or between the reflector 350 and the light source may be adjusted such that the target 310 passes between the light source and the reflector 350 when the blade bearing ring 101 is rotated. Additionally or alternatively, the dimensions of the target 310 and where it is attached on the blade bearing ring 101 may be adapted for this condition to be met.

The reflector 350 may be in an upper portion 355 of the support 335. In the example of FIG. 5, the LECD 305 and the reflector 350 are towards a lateral side 360 of the support 335, but in other examples the LECD 305 and the reflector 350 may be towards the other later side 365 of the support 335 or substantially centered.

It should be noted that the light source and the reflector 350 may be aligned in a direction parallel to a pitch axis, as in FIG. 5, but that this is not necessary.

In the present example, when target 310 is not located between light emitter and reflector, the light that is emitted substantially will all be received by the collector. When the target 310 is positioned in between light emitter and reflector, a reduced amount of light will be received. The system can thus identify that the target 310 is located at a known position or within a small range of known positions. As the bearing ring with target 310 is rotated further, the target portion 315 will be located between light emitter and reflector. If the target portion is formed as a slit, the light will be substantially fully reflected again. The precise position of target 310 and a target portion 315 with respect to LECD 305 may be identified.

In some examples, the support 335 may further comprise a mechanical switch 370. The mechanical switch 370 is configured to come into contact with the target 310 when the blade bearing ring 101 is rotated, for example when the target 310 is aligned with the light source in a direction substantially parallel to a pitch axis. In some of these examples, a mechanical switch 370 may be a limit switch. When the blade bearing ring 101 with the attached target 310 moves, it may run into the mechanical switch 370. The position at which this happens may be taken as a check, for example as a check that a feathered position has been reached.

Figure 6:
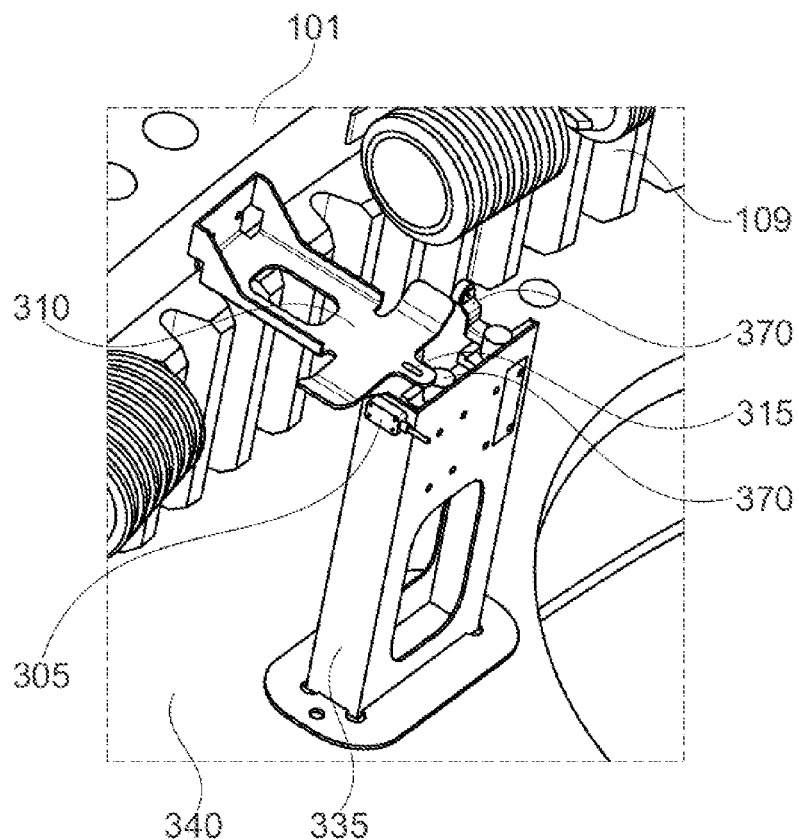
FIG. 6 schematically illustrates an example of a LECD mounted to another support.

The support 335 may comprise only a reflector 350, as in FIG. 5, only one or more mechanical switches 370, as in FIG. 6, or may comprise a reflector 350 and one or more mechanical switches 370 (not shown).

In some examples, an additional pitch reference may be determined first, and a pitch homing reference may be obtained from the additional reference afterwards. For instance, the position in which the target 310, e.g. a target portion 315, modifies the light emitted by the light source, and thus also received by the light sensor, may not be indicative of a position from which an initial pitch angle may be varied, e.g. a "zero" or "default below rated pitch position", but it may indicate another position, e.g. a position close to a feathered position. As long as the position of the target portion 315 is known with respect to this desired "zero" position, the information is sufficient for the control system.

Figure 7A:
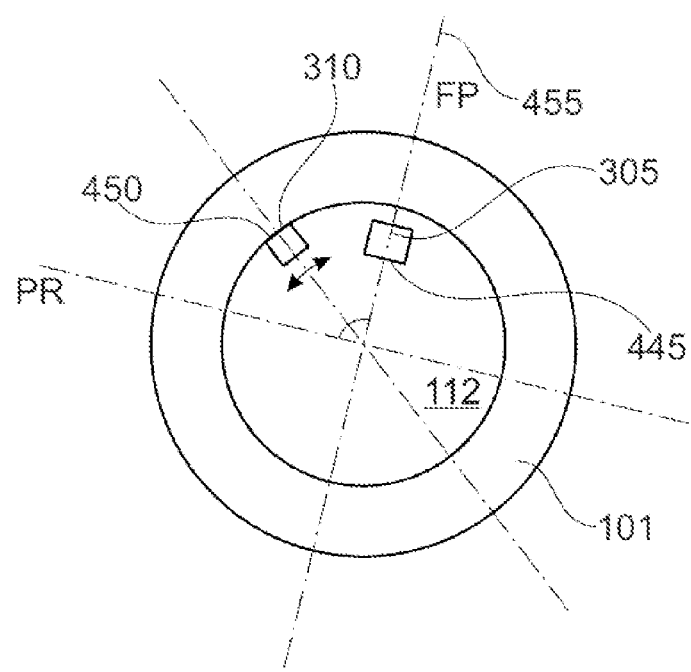
FIGS. 7A and 7B schematically illustrate a top view of a pitch bearing attached to a hub flange, each figure showing an example configuration in which a pitch homing reference may be indirectly determined from another detected pitch reference.
Figure 7B:
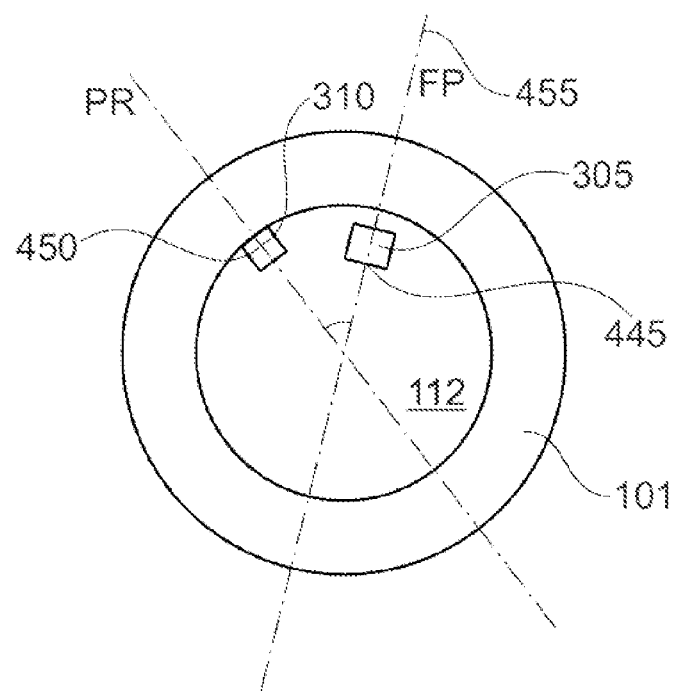

FIGS. 7A and 7B schematically illustrate a top view of a pitch bearing attached to a hub flange, each figure showing an example configuration in which a pitch homing reference may be indirectly determined from another detected pitch reference. For simplicity it has been assumed in these figures than the light source and the light sensor are place inside the LECD 305 and that light is emitted substantially parallel to a pitch axis.

In these figures, the target 310 and the sensor 305 may be placed at precise and known positions. For example, when an LECD is used, the light source and the light sensor may be placed at precise and known positions to the blade bearing ring 101 and the hub 110, respectively, such that when the emitted light meets the target 310 and the light sensor detects this, an indication of a feathered position (labeled as FP in FIGS. 7A and 7B) of a wind turbine blade 120 to be attached to the blade bearing ring 101 may have been found. If such a position is not the desired pitch reference (labeled as PR in FIGS. 7A and 7B), this additional reference may be detected by the light impinging on the target 310 and a homing reference position for the pitch may be determined afterwards.

For example, as schematically depicted in FIG. 7A, if a pitch homing reference PR is deemed to indicate a pitch position to be maintained at wind speeds lower than a nominal wind speed, e.g. in a first operational range above cut-in wind speed, the target 310 may be attached at this desired portion of the bearing and the LECD 305 may be attached at a location between 80 and 90° from this initial pitch reference, e.g. 88.5° away from the pitch homing reference. When the light emitted by the LECD 305 impinges on the target 310 and this is detected by the sensor, and the 88.5° position, thus a feathered position, is detected, the below rated pitch position may be known by subtracting 88.5° to the position found by the target 310 deviating light emitted by the light source and the light sensor detecting this event 310.

Again, it should be noted that the pitch homing reference may correspond to other positions different from a pitch position to be maintained at wind speeds lower than a nominal wind speed. Such a situation is schematically represented in FIG. 7B. In this example, the alignment of the target 310 and the LECD 305 may be indicative again of a substantially feathered position, but a pitch homing reference may be about 45°, e.g. 45.3°, away from the feathered position. For instance, once the feathered position has been determined with the aid of the LECD 305, 45.3° may be subtracted to the feathered position to find the pitch homing reference.

Likewise, the additional reference which in FIGS. 7A and 7B is indicative of a feathered position does not need to indicate such feathered position but may be any other position.

In this way, two different references of interest for the pitch control system may be established relatively easily, quickly and precisely.

Once the wind turbine is in operation, if one or more mechanical switches 370 are present, the target 310 running into them may indicate that the additional reference, e.g. a feathered position, has been achieved. This may serve as a cross-check that the desired additional reference has been attained.

In some examples, the blade bearing ring 101 is configured to permit mounting of a wind turbine blade 120 to the blade bearing ring 101 in a limited number of positions, and particularly in a single position.

In order to minimize an error when pitching a blade 120, once a pitch homing reference has been determined, a blade 120 is to be connected to the blade bearing ring 101 in a specific position according to the determined homing pitch reference. The blade 120 and/or the blade bearing ring may be configured to this end i.e. they may be configured such that an incorrect mounting of the blade is (almost) impossible.

In some examples, the blade bearing ring 101 may comprise one or more wind turbine blade attachment indicators 405. These indicators may enable a wind turbine blade 120 to be attached to the blade bearing ring 101 at a particular intended position. Errors in pitching the blade 120 may thus be avoided or at least minimized. The indicators may in some examples be visual.

In some examples, the wind turbine blade attachment indicators 405 may comprise recesses and/or protrusions complementary to protrusions and/or recesses, respectively, in a wind turbine blade joining flange 430 configured to be attached to the blade bearing ring 101. These protrusions and/or recesses may have specific sizes and shapes to facilitate the attachment and increase its precision.

Figure 8:
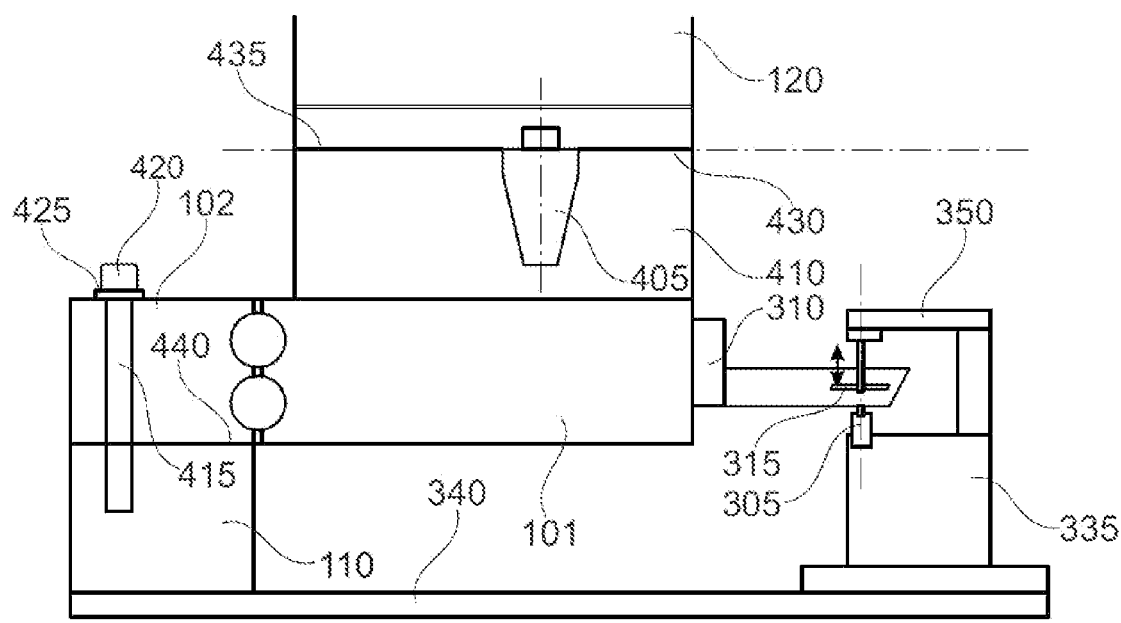
FIG. 8 schematically illustrates a cross-sectional view in a radial direction of an example of a pitch assembly.
Figure 9:
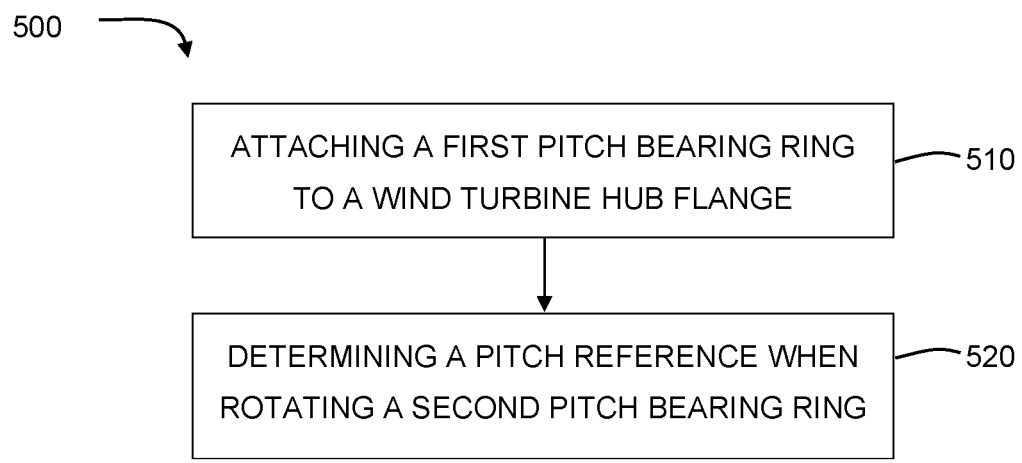
FIG. 9 schematically illustrates an example of a method for setting a pitch reference for a pitch control system of a wind turbine using a pitch assembly as described herein.
Figure 10:
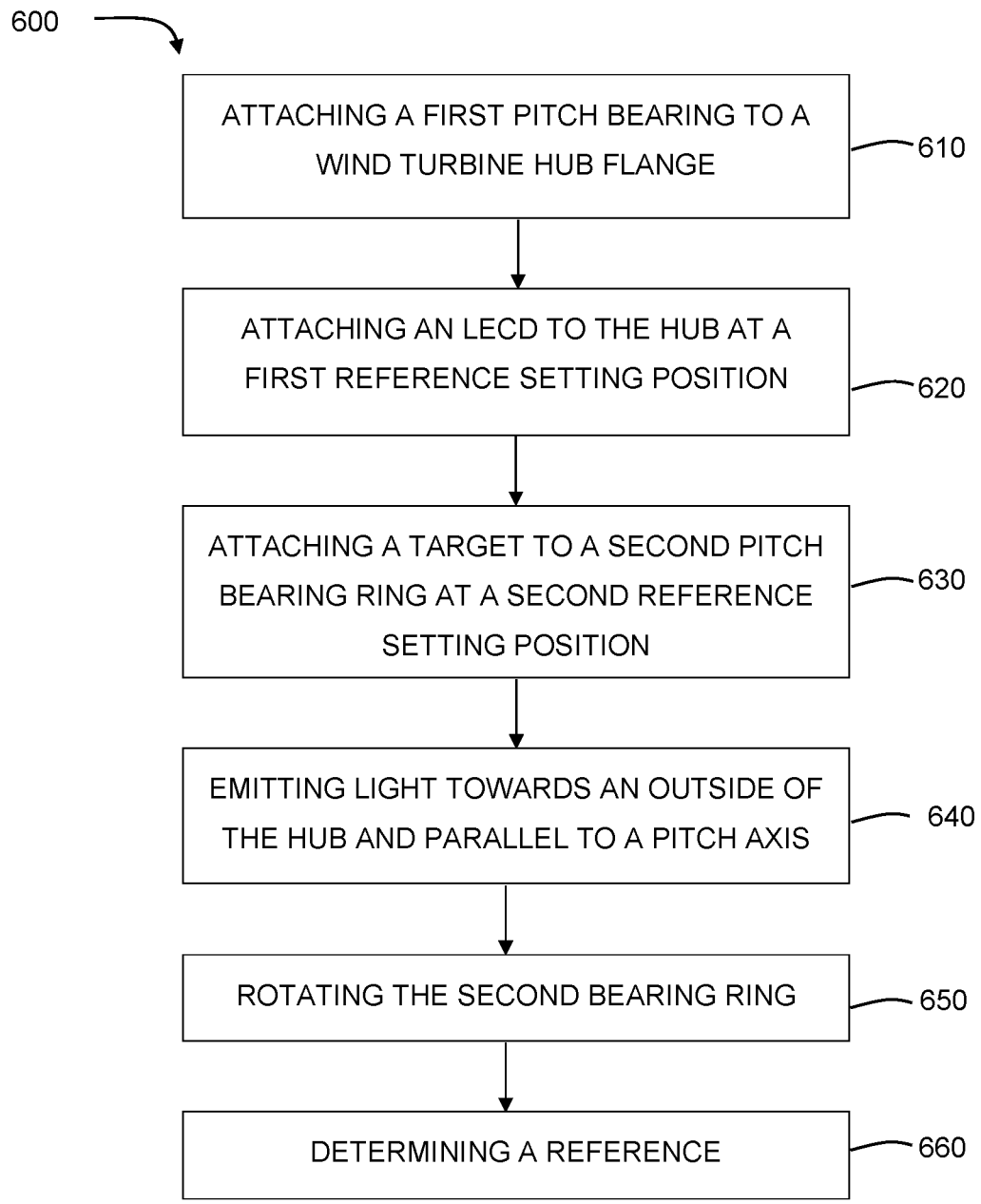
FIG. 10 schematically illustrates an example of a method for determining a reference usable for or during pitching of a wind turbine blade using a pitch assembly as described herein.

If a ring extender is used, see FIG. 8, the assembly 300 may further comprise a ring extender 410 wherein the ring extender 410 comprises one or more wind turbine blade attachment indicators 405, e.g. recesses 405 complementary to protrusions or fasteners, respectively, in a wind turbine blade joining flange 430 to be joined to the ring extender 410.

The ring extender 410 may be integrally formed with the blade bearing ring 101 in some examples. If this is not the case and the ring extender 410 and the blade bearing ring 101 are separate pieces, the ring extender 410 may comprise one or more wind turbine blade attachment indicators 405 such as recesses and/or protrusions complementary to protrusions and/or recesses, respectively, in a ring extender joining side 435 configured to be attached to the wind turbine blade 120.

Optionally, the ring extender 410 and the blade bearing ring 101 may also have complementary attachment indicators 405 such as recesses and/or protrusions in the sides where they may be joined to one another.

In some examples, one of the blade bearing ring 101 and the wind turbine blade 120 comprises a fastener and the other one is configured to receive the fastener. In some examples, a fastener may be a protrusion to be received by a complementary recess, as explained above. A ring extender 410 is also contemplated, and if present, the description above with respect to where a fastener and a corresponding fastener receiving element may be, applies as well.

Still in some other examples, paint, e.g. paint of a particularly well distinguishable color, may serve for indicating a desired orientation of the wind turbine blade 120 with respect to the hub 110.

Although the blade 120 should be attached in a single and intended position, it might happen that the blade 120 is attached in a non-desired position if several attachment indicators 405 or fasteners are provided. The attachment indicators 405 may have different shapes, dimensions and/or colors in some examples in order to avoid or at least reduce the possibilities of wrongly placing a blade 120 on a blade bearing ring 101. In some examples, more than one type of indicator may be used, e.g. fasteners and paint may be used together.

In some examples, the pitch assembly 300 may include a wind turbine blade 120 comprising one or more wind turbine blade attachment indicators 405, for example recesses and/or protrusions complementary to the protrusions and/or recesses, respectively, in a blade bearing ring 101 or a ring extender 410. The wind turbine blade 120 may likewise comprise one or more fasteners or may be configured to receive one or more fasteners. The blade 120 may additionally or alternatively include painted marks.

In some examples, guiding bushings may be used. I.e. bushings in a bearing ring may have a diameter that decreases from a first end in which a stud or other fastener is received to a second end. In this manner, correct mounting of the blade to the bearing ring may further be facilitated.

Although reference is made to recesses and/or protrusions it is to be understood that a single recess and/or a single protrusion in a piece (blade joining flange, blade bearing ring, ring extender) is also an option In another aspect of the invention, a method 500 for determining a reference for a pitch control system, the pitch reference being a reference point for the pitch control system, is provided. This method uses a pitch assembly 300 as described above, e.g. with reference to any of the FIGS. 3 to 8. The description with respect to one or more of these figures may be directly applied to this method.

The method comprises, at block 510, attaching a first bearing ring 102 of a pitch bearing 100 to a hub flange 440 of a wind turbine hub 110. The first bearing ring 102 has been previously referred to as hub bearing ring 102. The first bearing ring 102 may be a bearing inner ring 103 or a bearing outer ring 104.

The first bearing ring 102 may be attached to the hub 110, e.g. to a hub flange 440, by a bolted connection as for example shown in FIG. 8. With reference to FIG. 8, an end of a bolt 415 may be inserted, e.g. threaded or screwed, through an opening in the first ring 102. The other end of the bolt 415 may be secured to a nut 420. A washer 425 may additionally be arranged between the first bearing ring 102 and the nut 420.

The method further comprises, at block 520, determining a pitch reference by a sensor 305 detecting that a target 310 is in a predetermined position with respect to the sensor 305 when rotating a second bearing ring 101 of the pitch bearing 100.

The rotation may be driven e.g. by a pinion 108 engaging an annular gear 109 on the second bearing ring 101. The second bearing ring 101 is different from the first bearing ring 102 and has been referred to as blade bearing ring 101 before. The second bearing ring 101 may be a bearing inner ring 103 or a bearing outer ring 104.

As explained above, the sensor sensing the target may indicate that a specific reference has been achieved. For example, if an LECD is used as a sensor, a change in the light received by the light sensor caused by the target 310 intercepting the emitted light by the light source may indicate that a specific reference has been achieved. The specific reference may already be a pitch homing reference in some examples, and it may be an additional reference in other examples. That is to say, the determined reference may indicate a reference from which a homing reference can be determined. In some examples, the method may further comprise calculating the pitch homing reference from the determined reference. For instance, the additional reference may indicate a feathered position and the pitch homing reference may be then obtained from the feathered position reference. In any case, a precise pitch reference may be obtained.

As a wind turbine blade 120 does not need to be attached to the pitch bearing 100 for a pitch reference determination, especially of a pitch homing reference, the method may be performed away from an installation site, be it onshore or offshore. Installation and commissioning time may be accordingly reduced, and operator safety may be increased as they do not need to spend so much time at high altitudes in possibly not-ideal weather conditions.

If the sensor is an LECD, detecting that the target is in a predetermined position may comprise detecting a change in the light received by the light sensor when the target 310 modifies light emitted by the light source.

Although a sensor in the shown examples has generally been an LECD, other sensors may be used. In general, any sensor enabling to detect a position of the target with respect to the sensor may be used. For example, an inductive, capacitive, or magnetic sensor may be used. A contact or a color sensor may also be used. A sensor may be used in combination with a suitable target i.e. a target that allows detection by such sensor.

A sensor 305 may be attached to one of the wind turbine hub 110 and the second bearing ring 101 before rotating the second bearing ring 101. The sensor is configured to sense a target 310 such that a position of the target 310 with respect to the sensor 205 can be determined.

The sensor may be an LECD 305 comprising a light source and a light sensor. The sensor or LECD 305 may be attached to an inside 112 portion or an outside 111 portion of the hub 110. As explained above, the light source may be configured to emit light towards an outside 111 of the hub 110 in some examples. The light sensor is configured to receive one or more reflections of the emitted light. The light may be emitted substantially parallel to a pitch axis (PA) in some examples.

The sensor or LECD 305 may be attached by mechanical and/or adhesive fasteners to the hub 110, e.g. to a platform 340 inside 112 or outside 111 the hub 110. The sensor or LECD 305 may be directly or indirectly attached to the hub 110. Indirect attachment may include a support 335. In such examples, the sensor or LECD 305 may be attached to the support 335, for instance to an upper portion 355 of the support 335, and the support 335 may be attached to the hub 110, e.g. to a platform 340. An arm may be also used to place the sensor or LECD 305 in a suitable position and connect it to the hub 110, e.g. if the blade bearing ring 101 is a bearing outer ring 104. The light source and the light sensor may be separately attached to the hub 110. In some examples the light source may be attached to the support 335 and the light sensor may be attached to a platform 340.

In other examples, a sensor may be attached to the second bearing ring 101.

A target 310 may be attached to the other of the second bearing ring 101 and the wind turbine hub 110. As described with respect to FIGS. 3 to 5, the target 310 may be configured to modify light emitted by the light source when the second bearing ring 101 is rotated. The trajectory of the emitted light and/or properties such as reflection of the emitted light may be modified by the target 310.

If an LECD is used, light may be emitted by the light source. Rotation of the second bearing ring 101 may start before or afterwards emitting the light has started. Optionally the light may be emitted towards an outside of the hub and/or substantially parallel to a pitch axis.

The target 310 may include a target portion 315 with different reflectivity properties that other portions of the target 310, e.g. all the other portions of the target 310. The target portion 315 may be of or may include a piece of a different material than other portions target 110 in some examples. For instance, the target portion 315 may be more reflective than other portions of the target 110. The target portion 315 may e.g. include reflective paint or may be a slit. An enhanced precision in the detection of a change in the light received by the light sensor may be obtained by adding a target portion 315 as described.

If the second bearing ring 101 is an inner bearing ring 103, the target 310 may be attached to the inner bearing ring 103 side facing an inside 112 of the hub 110, e.g. the side including an annular gear 109, in some examples. If the second bearing ring 101 is a bearing outer ring 104, the target may be attached to the bearing outer ring 104 side facing an outside 111 of the hub 110 in some examples. I.e., the target 310 may in general be attached to a side 330 of the second bearing ring 101 on which a drive is configured to act. In some other examples, the target 310 may be attached to any other side of the second bearing ring 101.

Still in some other examples, the target 310 may be attached to the wind turbine hub 110.

The target 310 may be attached to the second bearing ring 101 or the hub 110 by one or more fasteners. The one or more fasteners may comprise mechanical fasteners 325 and/or adhesive fasteners. The target 310 may be joined to the second bearing ring 101 before or after attaching the pitch bearing 100, in particular the first bearing ring 102, to the hub 110.

Similarly, the sensor or LECD 305 may be attached to the hub 110 or the second bearing ring 101 before or after the pitch bearing 110 is mounted to the hub 110, and before or after the target 310 is attached to the second bearing ring 101 or the hub 110.

In some examples where a support 335 is used, the support 335 may include a reflector 350 as explained before. A reflector 350 may help the light sensor to easier and clearer detect changes in the light it receives. If a target portion 315 is present, the reflector 335 may be used with any configuration of the target portion 315. The support 335 may alternatively or additionally include one or more mechanical switches 370.

If a pitch homing reference is to be determined directly, the target 310 and the sensor or LECD 305 may be attached at a position desired for the pitch reference in some examples. The desired position of the target 310, e.g. on the second bearing ring 101, and of the sensor or LECD 305, e.g. with respect to the ring 101, is known in advance. The desired position may be such that when the target 310 and the sensor or the light source are aligned by moving the second bearing ring 101, the pitch homing reference is determined. Alignment may take place along a direction substantially parallel to the pitch axis.

If a pitch reference is to be determined indirectly, the target 310 and the sensor may be attached to any suitable location. For example, the target 310 and the LECD 305 may be attached at a position such that the additional reference is found when the light emitted by the light source impinges on the target 310, e.g. on a target portion 315, and the light sensor detects this event.

In some examples, the pitch homing reference may indicate a pitch position to be maintained at wind speeds lower than a nominal wind speed.

In some other examples, the determined reference may be indicative of a feathered position. In some of these examples, the target 310 and the sensor or LECD 305 may be attached at a same position between an angle of about 80° to about 100° away from the position desired for a pitch homing reference. The pitch homing reference may be a below rated pitch position. "A same position" refers to the fact that the target 310 and the sensor or LECD 305 are placed at a same angle away from the desired pitch homing reference, e.g. about 95° away from it.

The pitch reference may be obtained by subtracting the angle of about 80° to about 100° to the position in which e.g. alignment in a direction substantially parallel to a pitch axis has occurred.

In some examples, the method may further comprise attaching a wind turbine blade 120 to the second bearing ring 101 or to a ring extender 410 according to the determined pitch reference, e.g. a pitch homing reference.

This may include attaching the blade, e.g. a wind turbine blade joining flange 430, in a predefined position. A predefined position may be indicated by one or more attachment indicators 405 or in general any indicator.

As explained previously, a wind turbine blade 120, e.g. a wind turbine blade joining flange 430, may comprise one or more wind turbine blade attachment indicators 405 such as paint, fasteners, fastener receivers, protrusions and/or recesses. If directly joined to the second bearing ring 101, the second bearing ring 101 may include attachment indicators 405 configured to be matched with the indicators 405 in the blade 120.

In some examples, attaching the wind turbine blade 120 may comprise inserting a fastener into a complementary receptacle.

In some examples, the one or more wind turbine blade attachment indicators 405 may be protrusions and/or recesses and the method may comprise fitting a wind turbine blade joining flange 430 comprising recesses and/or protrusions to complementary protrusions and/or recesses, respectively, provided in the second bearing ring 101. The protrusions and recesses may have complementary shapes for facilitating the insertion of the protrusions into the recesses, e.g. as illustrated in FIG. 8.

More than one type of indicator 405 may be used simultaneously. For example, fasteners and paint be used together, or protrusions and/or recesses may be used in combination with paint. Paint marks besides fasteners or protrusions and/or recesses may help to orient the blade 120 with respect to the second bearing ring 101 for an attachment in a particular intended position.

The wind turbine blade 120 may be then secured to the blade bearing ring 101 by bolted connections 415.

If a wind turbine blade 120 is not attached directly to the second bearing ring 101, but to a separate ring extender 410, the method may further comprise attaching a ring extender 410 to the second bearing ring 101 and attaching a wind turbine blade 120 to the ring extender, the blade 120 and ring extender 410 being configured to be attached in a limited number of positions, preferably in a single predefined position. The blade 120 and may be attached to the ring extender 410 as explained above with respect to joining the blade 120 and the second bearing ring 120.

Any of the blade 120 and the ring extender 410 may comprise one or more wind turbine blade attachment indicators 405 which may be complementary, e.g. in shape, in the sides in which they are configured to come into contact. For example, the blade 120 may have a certain number of protrusions and the ring extender 310 may have the same certain number of recesses, and the method may include inserting the blade protrusions into the ring extender recesses.

If not integrally formed with the second bearing ring 101, the ring extender 401 may further include one or more wind turbine blade attachment indicators 405 configured to be joined to one or more wind turbine blade attachment indicators 405 provided in the second bearing ring 101. The one or more wind turbine blade attachment indicators 405 may be protrusions and/or recesses in some examples. The ring extender 401 may then be attached to the second bearing ring 101.

The sensor or LECD 305 and the target 310 may be detached from the hub 110 and second bearing ring 101 before installing the wind turbine 160 in some examples. In some other examples, they may be kept attached such that a pitch reference may be determined again if lost during wind turbine operation for any reason. E.g. when a pitch control system is changed, or after performing maintenance on a pitch bearing.

If they are maintained and kept in place throughout normal operational life, the support 335 may comprise one or more mechanical switches 370, e.g. limit switches, for checking that an additional reference has been achieved. In some examples, pitching the blade 120 may be stopped when one or more mechanical switches 370 on a support 315 hit the target 310, even if the position at what the collision happens does not correspond to a pitch angle indicated by a wind turbine controller. The collision may be used as a way of checking that the correct position has been reached by pitching.

In another aspect, a method 600 for determining a pitch reference usable for or during pitching of a wind turbine blade 120 is provided. This method uses a pitch assembly 300 as described above, e.g. with reference to any of FIGS. 3 to 8. The description with respect to one or more of these figures may be directly applied to this method.

The method comprises, at block 610, attaching a first ring 102 of a pitch bearing 100 to a hub flange 440 of a wind turbine hub 110. As explained before, the hub flange 440 and the attached bearing 100 define a circumferential direction 320 and a radial direction 321. A pitch axis is substantially parallel to these directions 320, 321.

The first bearing ring 102 may be attached to the hub flange 440 by nuts 420 and bolts 415, as e.g. in FIG. 8.

The method further comprises, at block 620, attaching an LECD comprising a light source and a light sensor to the hub 110 at a first reference setting position 445.

This first position 445 is a predetermined position and represents an indicator of a reference, for example an indicator of a pitch reference or an additional reference. The LECD 305 may be mounted directly to the hub 110, e.g. to a platform 340 of the hub 110, or may be mounted indirectly to it, for instance to a support 335.

The method further comprises, at block 630, attaching a target 310 to a second ring 101 of the pitch bearing 100 at a second reference setting position 450.

This second position 450 is also a predetermined position and represents an indicator of a reference, for example an indicator of a pitch reference or an additional reference, too. The target 310 may be attached to a side 330 of the second bearing ring 101 on which a drive is configured to act in some examples.

The method further comprises, at block 640, emitting light towards an outside 111 of the hub 110 and parallel to a pitch axis.

The method further comprises, at block 650, rotating the second bearing ring 101. A drive such as a pinion 108 configured to act on an annular gear 109 may be used. Hydraulic actuation instead of mechanical actuation is possible.

Light may begin to be emitted before or after the rotation of the second bearing ring 101.

The method further comprises, at block 660, determining a pitch reference 455 by detecting a change in the light received by the light sensor when the first 445 and second 450 reference setting positions become aligned in a direction substantially parallel to a pitch axis.

The light source emits light and the light sensor receives one or more reflections of the emitted light. When the target 310 passes above the light sensor, in particular aligning the first 335 and second 450 reference setting positions in a direction substantially parallel to a pitch axis, the target 310 may reflect the light emitted by the light source. The light sensor may thus detect a change in the light it is receiving, being this indicative that a pitch reference has been attained.

In some examples, the determined reference is a pitch homing reference. A point or axis from which pitch angles may be measured, calculated and/or indicated may therefore be determined directly, precisely, and without the need to attach a wind turbine blade 120 to the hub flange 440.

In some other examples, the determined reference is an intermediate reference from which a pitch homing reference from a pitch homing reference can be calculated. This intermediate reference corresponds to the additional reference in method 500. By calculating an intermediate reference first, two references of interest may be obtained with a single LECD 305 and target 310. By knowing that the first 445 and second 450 reference setting positions are away a certain angle from the desired pitch homing reference (once aligned), the pitch homing reference may be quickly found as already explained herein.

In some of these examples, the first 445 and second 450 reference setting positions are configured to be a same angle of about 80° to about 100° away from the pitch homing reference when aligned. In other words, the pitch homing reference and the intermediate reference may be designed to be between 80° and 100° apart. In some examples, the pitch homing reference may indicate a pitch position to be kept at wind speeds lower than a nominal wind speed. The intermediate reference may indicate a feathered position.

One or more teachings from method 500 may be applied to method 600 and vice versa. For example, one or more mechanical switches 370 may be used in method 600. Ring extenders 410 and/or one or more types of wind turbine blade attachment indicators 405 may also be used in method 600.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A wind turbine pitch assembly, comprising:
a wind turbine hub;
a pitch bearing comprising a hub bearing ring attached to a hub flange of the wind turbine hub and a blade bearing ring configured to be attached to a wind turbine blade;
a target attached to an inner surface of the blade bearing ring;
a support connected to the wind turbine hub, the support comprising a sensor mounted radially inward of the target at a first height and a reflector mounted at a different, second height, the sensor and the reflector being spaced apart from each other to define a gap therebetween,
wherein the sensor comprises a light source and a light sensor that receives one or more reflections of emitted light from the light source, and wherein the target has predefined reflective characteristics such that a position of the target with respect to the light sensor is determined by the target passing through the gap between the sensor and the reflector when the blade bearing ring is rotated.

2. The wind turbine pitch assembly of claim 1, wherein the light sensor is a light emitting and collecting device (LECD).

3. The wind turbine pitch assembly of claim 1, wherein the target comprises a target portion with different reflectivity properties than other portions of the target.

4. The wind turbine pitch assembly of claim 1, further wherein the support comprises a mechanical switch configured to come into contact with the target when the blade bearing ring is rotated.

5. The wind turbine pitch assembly of claim 1, wherein the blade bearing ring comprises one or more wind turbine blade attachment indicators.

6. A method of operating a wind turbine having a pitch control system, the method comprising:
attaching a hub bearing ring of a pitch bearing to a hub flange of a wind turbine hub;
attaching a support to the wind turbine hub, the support comprising a sensor mounted radially inward of the target at a first height and a reflector mounted at a different, second height, the sensor and the reflector being spaced apart from each other to define a gap therebetween, the sensor comprising a light source and a light sensor that receives one or more reflections of emitted light from the light source;
determining a pitch homing reference for the pitch control system after the hub bearing ring is attached to the hub flange, the pitch homing reference being a reference point for the pitch control system;
after determining the pitch homing reference, attaching a blade bearing ring to a wind turbine blade of the wind turbine;
wherein determining the pitch homing reference comprises detecting, with the sensor, that the target is in a predetermined position with respect to the sensor when rotating the blade bearing ring, wherein the target has predefined reflective characteristics such that the predetermined position of the target with respect to the light sensor is determined by the target passing through the gap between the sensor and the reflector when the blade bearing ring is rotated; and
operating the wind turbine once the target is in the predetermined position.

7. The method of claim 6, wherein the sensor is a light emitting and collecting device (LECD) comprising a light source and a light sensor, and wherein detecting that the target is in the predetermined position comprises detecting a change in the light received by the light sensor when the target modifies light emitted by the light source.

8. The method of claim 7, wherein the light is emitted from the light source substantially parallel to a pitch axis.

9. The method of claim 7, wherein the pitch homing reference indicates a pitch position to be maintained at wind speeds lower than a nominal wind speed.

10. The method of claim 6, wherein the pitch homing reference indicates a feathered position.

11. The method of claim 6, wherein the blade bearing ring is configured for mounting to the wind turbine blade thereto in a single position after the pitch reference is determined.

* * * * *